United States Patent
McCann

(10) Patent No.: US 9,635,526 B2
(45) Date of Patent: Apr. 25, 2017

(54) METHODS, SYSTEMS, AND COMPUTER READABLE MEDIA FOR UTILIZING A DIAMETER PROXY AGENT TO COMMUNICATE SHORT MESSAGE SERVICE (SMS) MESSAGES

(71) Applicant: Tekelec, Inc., Morrisville, NC (US)

(72) Inventor: Thomas Matthew McCann, Raleigh, NC (US)

(73) Assignee: TEKELEC, INC., Morrisville, NC (US)

( * ) Notice: Subject to any disclaimer, the term of this patent is extended or adjusted under 35 U.S.C. 154(b) by 110 days.

(21) Appl. No.: 13/815,751

(22) Filed: Mar. 15, 2013

(65) Prior Publication Data

US 2014/0274170 A1    Sep. 18, 2014

(51) Int. Cl.
*H04W 60/00* (2009.01)
*H04L 12/58* (2006.01)
(Continued)

(52) U.S. Cl.
CPC ............... *H04W 4/14* (2013.01); *H04L 51/38* (2013.01); *H04W 60/00* (2013.01); *H04W 8/28* (2013.01)

(58) Field of Classification Search
CPC ... H04W 64/00; H04W 88/18; H04W 88/182; H04W 60/00
(Continued)

(56) References Cited

U.S. PATENT DOCUMENTS 4,310,727 A    1/1982 Lawser
4,754,479 A    6/1988 Bicknell et al.
(Continued)

FOREIGN PATENT DOCUMENTS

CN         1968267 A       5/2007
CN    ZL 200780034804.1   9/2015
(Continued)

OTHER PUBLICATIONS

Third Office Action for Chinese Application No. 200880103119.4 (Aug. 19, 2013).
(Continued)

*Primary Examiner* — Asghar Bilgrami
(74) *Attorney, Agent, or Firm* — Jenkins, Wilson, Taylor & Hunt, P.A.

(57) ABSTRACT

A method for utilizing a Diameter proxy agent to communicate short message service (SMS) messages in a Diameter network includes receiving, from an SMS service center via a Diameter interface, a mobile subscriber location information request message directed to a home subscriber server (HSS), wherein mobile subscriber location information request message is associated with a recipient mobile subscriber. The method further includes querying a number portability database to determine whether the recipient mobile subscriber has been ported to a foreign network and forwarding the mobile subscriber location information request message toward a gateway associated with the foreign network In response to determining the recipient mobile subscriber has been ported to the foreign network. The method also includes, in response to determining the recipient mobile subscriber has not been ported to the foreign network, forwarding the request message to the HSS in the first network or the foreign network.

28 Claims, 4 Drawing Sheets

(51) Int. Cl.
*H04W 4/14* (2009.01)
*H04W 8/28* (2009.01)

(58) Field of Classification Search
USPC ........................................................ 455/466
See application file for complete search history.

(56) References Cited

U.S. PATENT DOCUMENTS

| | | |
|---|---|---|
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Aström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichanie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,411,632 B2 | 6/2002 | Lindgren et al. |
| 6,424,832 B1 | 7/2002 | Britt et al. |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,594,258 B1 | 7/2003 | Larson et al. |
| 6,611,516 B1 | 8/2003 | Pirkola et al. |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,795,701 B1 | 9/2004 | Baker et al. |
| 6,839,421 B2 | 1/2005 | Ferraro Esparza et al. |
| 6,871,070 B2 | 3/2005 | Ejzak |
| 6,917,612 B2 | 7/2005 | Foti et al. |
| 6,950,441 B1 | 9/2005 | Kaczmarczyk et al. |
| 7,010,002 B2 | 3/2006 | Chow et al. |
| 7,027,582 B2 | 4/2006 | Khello et al. |
| 7,079,524 B2 | 7/2006 | Bantukul et al. |
| 7,079,853 B2 | 7/2006 | Rathnasabapathy et al. |
| 7,085,260 B2 | 8/2006 | Karaul et al. |
| 7,221,952 B2 | 5/2007 | Cho et al. |
| 7,457,283 B2 | 11/2008 | Dalton, Jr. et al. |
| 7,627,108 B1 | 12/2009 | Enzmann et al. |
| 7,693,135 B2 | 4/2010 | Pershan |
| 7,715,367 B2 | 5/2010 | Nishida et al. |
| 7,746,864 B1 | 6/2010 | Asawa et al. |
| 7,751,386 B2 | 7/2010 | Kobayashi et al. |
| 7,787,445 B2 | 8/2010 | Marsico |
| 7,996,541 B2 | 8/2011 | Marathe et al. |
| 8,131,266 B2 | 3/2012 | Cai et al. |
| 8,184,798 B2 | 5/2012 | Waitrowski et al. |
| 8,254,551 B2 | 8/2012 | Heinze et al. |
| 8,594,679 B2 | 11/2013 | Agarwal et al. |
| 2001/0030957 A1 | 10/2001 | McCann et al. |
| 2001/0040957 A1 | 11/2001 | McCann et al. |
| 2002/0054674 A1 | 5/2002 | Chang et al. |
| 2002/0114440 A1 | 8/2002 | Madour et al. |
| 2002/0147845 A1 | 10/2002 | Sanchez-Herrero et al. |
| 2002/0173320 A1 | 11/2002 | Aitken et al. |
| 2002/0176562 A1 | 11/2002 | Hao |
| 2003/0007482 A1 | 1/2003 | Khello et al. |
| 2003/0026289 A1 | 2/2003 | Mukherjee et al. |
| 2003/0054844 A1 | 3/2003 | Anvekar et al. |
| 2003/0081754 A1 | 5/2003 | Esparza et al. |
| 2003/0109271 A1 | 6/2003 | Lewis et al. |
| 2003/0128693 A1 | 7/2003 | Segal |
| 2003/0193967 A1 | 10/2003 | Fenton et al. |
| 2003/0227899 A1 | 12/2003 | McCann |
| 2004/0003114 A1 | 1/2004 | Adamczyk |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0141488 A1 | 7/2004 | Kim et al. |
| 2004/0142707 A1 | 7/2004 | Midkiff et al. |
| 2004/0196858 A1 | 10/2004 | Tsai et al. |
| 2004/0198351 A1 | 10/2004 | Knotts |
| 2004/0202187 A1 | 10/2004 | Kelly et al. |
| 2004/0243596 A1 | 12/2004 | Lillqvist et al. |
| 2004/0246965 A1 | 12/2004 | Westman et al. |
| 2005/0002407 A1* | 1/2005 | Shaheen ............ H04L 12/5835 370/401 |
| 2005/0003838 A1 | 1/2005 | McCann et al. |
| 2005/0119017 A1 | 6/2005 | Lovell et al. |
| 2005/0176448 A1 | 8/2005 | Klockner |
| 2005/0182781 A1 | 8/2005 | Bouvet |
| 2005/0286531 A1 | 12/2005 | Tuohino et al. |
| 2006/0002308 A1 | 1/2006 | Na et al. |
| 2006/0002400 A1 | 1/2006 | Kenyon et al. |
| 2006/0067338 A1 | 3/2006 | Hua et al. |
| 2006/0068762 A1* | 3/2006 | Baldwin et al. ........... 455/412.1 |
| 2006/0136557 A1 | 6/2006 | Schaedler et al. |
| 2006/0165068 A1 | 7/2006 | Dalton et al. |
| 2006/0245573 A1 | 11/2006 | Sheth et al. |
| 2007/0061397 A1 | 3/2007 | Gregorat et al. |
| 2007/0104184 A1 | 5/2007 | Ku et al. |
| 2007/0115934 A1 | 5/2007 | Dauster et al. |
| 2007/0116250 A1 | 5/2007 | Stafford |
| 2007/0121879 A1 | 5/2007 | McGary et al. |
| 2007/0191003 A1 | 8/2007 | Smith et al. |
| 2007/0238465 A1 | 10/2007 | Han et al. |
| 2007/0243876 A1 | 10/2007 | Duan |
| 2007/0286379 A1 | 12/2007 | Wiatrowski et al. |

(56) References Cited

U.S. PATENT DOCUMENTS

| | | | |
|---|---|---|---|
| 2008/0068762 | A1 | 3/2008 | Kobayashi et al. |
| 2008/0109532 | A1 | 5/2008 | Denoual et al. |
| 2008/0112399 | A1 | 5/2008 | Cohen et al. |
| 2008/0130856 | A1 | 6/2008 | Ku et al. |
| 2008/0137832 | A1 | 6/2008 | Heinze et al. |
| 2008/0247526 | A1 | 10/2008 | Qiu et al. |
| 2008/0281975 | A1 | 11/2008 | Qiu et al. |
| 2009/0103707 | A1 | 4/2009 | McGary et al. |
| 2009/0181671 | A1* | 7/2009 | Preiss ............... H04L 63/0428 455/435.1 |
| 2009/0227276 | A1* | 9/2009 | Agarwal ............... H04W 8/30 455/466 |
| 2010/0278122 | A1* | 11/2010 | Singh .................. H04L 69/161 370/329 |
| 2011/0038287 | A1* | 2/2011 | Agarwal ............. H04L 12/5865 370/310 |
| 2011/0098049 | A1 | 4/2011 | Gosnell et al. |
| 2012/0184307 | A1* | 7/2012 | van Velsen .................. 455/466 |
| 2013/0079009 | A1* | 3/2013 | Aumann ............... H04W 16/02 455/436 |
| 2013/0115983 | A1* | 5/2013 | Ronneke ................ H04L 51/38 455/466 |
| 2014/0206403 | A1* | 7/2014 | Buckley ................. H04W 4/14 455/466 |

FOREIGN PATENT DOCUMENTS

| | | |
|---|---|---|
| EP | 0 512 962 A2 | 11/1992 |
| EP | 0 936 825 A3 | 8/1999 |
| EP | 0 944 276 A1 | 9/1999 |
| EP | 2 047 667 B1 | 5/2014 |
| EP | 2 033 431 B1 | 8/2014 |
| EP | 2 165 557 B1 | 5/2015 |
| IN | 274670 | 8/2016 |
| IN | 275525 | 8/2016 |
| KR | 2003-0040291 A1 | 5/2003 |
| WO | WO 95/12292 A1 | 5/1995 |
| WO | WO 96/11557 | 4/1996 |
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 01/54444 A1 | 7/2001 |
| WO | WO 02/096147 A1 | 11/2002 |
| WO | WO 03/005664 A2 | 1/2003 |
| WO | WO 2004/006534 A1 | 1/2004 |
| WO | WO 2004/075507 A2 | 9/2004 |
| WO | WO 2007/045991 A1 | 4/2007 |
| WO | WO 2007/146257 A2 | 12/2007 |
| WO | WO 2008/011101 A2 | 1/2008 |
| WO | WO 2008/073226 | 6/2008 |
| WO | WO 2008/157213 A2 | 12/2008 |
| WO | WO 2012/119147 A1 | 9/2012 |
| WO | WO 2014/116700 A2 | 7/2014 |

OTHER PUBLICATIONS

Notice of Allowance and Fee(s) Due for U.S. Appl. No. 12/400,576 (Jul. 19, 2013).
Second Office Action for Chinese Application No. 200880103119.4 (Mar. 19, 2013).
3rd Generation Partnership Project, "Technical Specification Group Core Network and Terminals; Diameter based protocols to support Short Message Service (SMS) capable Mobile Management Entities (MMEs)," 3GPP TS 29.338, V12.0.0, pp. 1-40 (Mar. 2013).
3rd Generation Partnership Project, "Technical Specification Group Services and System Aspects; Circuit Switched (CS) fallback in Evolved Packet System (EPS); Stage 2," 3GPP TS 23.272, V10.10.0, pp. 1-84 (Mar. 2013).
Decision of Rejection for Chinese Patent Application No. 200780034804.1 (Aug. 31, 2012).
Notice of Loss of Rights Pursuant to Rule 112(1) EPC for European Patent Application No. 07867566.7 (Jul. 31, 2012).
First Official Action for Chinese Patent Application No. 200880103119.4 (Jul. 4, 2012).
Advisory Action for U.S. Appl. No. 12/400,576 (Jun. 26, 2012).
Notice of Allowance and Fee(s) Due for U.S. Appl. No. 11/635,406 (Apr. 20, 2012).
Advisory Action for U.S. Appl. No. 11/635,406 (Mar. 14, 2012).
Final Official Action for U.S. Appl. No. 12/400,576 (Mar. 9, 2012).
Interview Summary for U.S. Appl. No. 11/635,406 (Mar. 7, 2012).
Second Office Action for Chinese Patent Application No. 200780034804.1 (Feb. 21, 2012).
Notice of Allowance and Fee(s) Due for U.S. Appl. No. 11/605,837 (Jan. 20, 2012).
Final Official Action for U.S. Appl. No. 11/635,406 (Nov. 30, 2011).
Notice of Panel Decision from Pre-Appeal Brief Review for U.S. Appl. No. 11/635,406 (Oct. 3, 2011).
Non-Final Official Action for U.S. Appl. No. 12/400,576 (Aug. 24, 2011).
Notice of Publication of Abstract for Indian Patent Application No. 6406/CHENP/2010 A (Jun. 17, 2011).
Interview Summary for U.S. Appl. No. 11/605,837 (May 24, 2011).
First Office Action for Chinese Patent Application No. 200780034804.1 (May 19, 2011).
Final Official Action for U.S. Appl. No. 11/635,406 (Apr. 5, 2011).
Notice of Allowance and Fee(s) Due for U.S. Appl. No. 11/888,907 (Apr. 1, 2011).
Non-Final Official Action for U.S. Appl. No. 11/605,837 (Feb. 1, 2011).
Chinese Official Action for Chinese Patent Application No. 200780030069.7 (Jan. 31, 2011).
"Ericsson Unified Number Portability," (Downloaded from the Internet on Jan. 24, 2011).
Official Action for U.S. Appl. No. 11/888,907 (Sep. 16, 2010).
Communication pursuant to Article 94(3) EPC for European application No. 07810606.9 (Aug. 26, 2010).
Official Action for U.S. Appl. No. 11/635,406 (Aug. 26, 2010).
Official Action for U.S. Appl. No. 11/605,837 (Jul. 20, 2010).
Tsou et al., "Realm-Based Redirection in Diameter," draft-ietf-dime-realm-based-redirect-03, RFC 3588, pp. 1-6 (Jul. 12, 2010).
Notice of Allowance and Fee(s) Due for U.S. Appl. No. 11/879,737 (Apr. 22, 2010).
Communication pursuant to Article 94(3) EPC for European application No. 07810606.9 (Feb. 12, 2010).
Korhonen at al., "Clarifications on the Routing of Diameter Requests Based on the Username and the Realm," RFC 5729, pp. 1-9 (Dec. 2009).
Supplementary European Search Report for European application No. 07810606.9 (Nov. 23, 2009).
Notification of Transmittal of the International Search Report and The Written Opinion of the International Searching Authority, or the Declaration for International Application No. PCT/US2009/036538 (Sep. 30, 2009).
Non-Final Official Action for U.S. Appl. No. 11/879,737 (Sep. 30, 2009).
Communication of European publication number and information on the application of Article 67(3) EPC for European application No. 07867566.7 (Aug. 12, 2009).
Final Official Action for U.S. Appl. No. 11/879,737 (Jun. 9, 2009).
Communication of European publication number and information on the application of Article 67(3) EPC for European Application No. 07810606.9 (Mar. 18, 2009).
Communication of European publication number and information on the application of Article 67(3) EPC for European Application No. 07809476.0 (Feb. 11, 2009).
Notification of Transmittal of the International Search Report and the Written Opinion of the International Searching Authority, or the Declaration for International Application No. PCT/US2008/066675 (Dec. 9, 2008).
Notification of Transmittal of the International Search Report and the Written Opinion of the International Searching Authority, or the Declaration for International Application No. PCT/US07/16370 (Sep. 15, 2008).

(56) References Cited

OTHER PUBLICATIONS

Official Action for U.S. Appl. No. 11/879,737 (Sep. 15, 2008).
Notification of Transmittal of the International Search Report and the Written Opinion of the International Searching Authority, or the Declaration for International Application No. PCT/US07/24418 (May 1, 2008).
"3rd Generation Partnership Project; Technical Specification Group Services and System Aspects; Policy and charging control architecture (Release 8)," 3GPP TS 23.203, V8.1.1, pp. 1-87 (Mar. 2008).
Notification of Transmittal of the International Search Report and Writtent Opinion of the International Searching Authority, or the Declaration for International Application No. PCT/US07/13732 (Jan. 29, 2008).
Notice of Allowance for U.S. Appl. No. 10/729,519 (Jul. 30, 2007).
"IP Multimedia Subsystem," printout from wikipedia.org, Wikimedia Foundation, Inc. (May 29, 2007).
Official Action for U.S. Appl. No. 10/729,519 (Nov. 28, 2006).
"HP OpenCall Home Subscriber Server Software—Data Sheet", 4AA0-3360ENW Rev. 2, Hewlett-Packard Development Company, L.P. (Jul. 2006).
Lucent Technologies, "ENUM Use and Management for the Successful Deployment of ENUM-Enabled Services; Understand ENUM and its Deployment to Insure Success of your VoIP and Other ENUM-enabled Services," White Paper, pp. 1-12 (Jul. 2006).
Stiemerling et al., "NAT/Firewall NSIS Signaling Layer Protocol (NSLP)," draft-ietf-nsis-nslp-natfw-06, pp. 1-70 (May 16, 2005).
Schwarz, "ENUM Trial to Link Phone, Internet Addresses," (Mar. 22, 2005).
Peterson, "Telephone Number Mapping (ENUM) Service Registration for Presence Services," Network Working Group, RFC 3953 (Jan. 2005).
Jones, "The Definitive Guide to Scaling Out SQL Server," http://www.snip.gob.ni/Xdc/SQL/DGSOSSFinal.pdf (Retrieved on Aug. 16, 2010) (2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Peterson et al., "Using E.164 Numbers With the Session Initiation Protocol (SIP)," Network Working Group, RFC 3824, pp. 1-14 (Jun. 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Office Communication for U.S. Appl. No. 09/759,743 (Oct. 20, 2003).
Cisco, "Quality of Service Networks," Internetworking Technologies Handbook, Chapter 49, pp. 49-1-49-32 (Sep. 11, 2003).
Moodie, "Agilent acceSS7: White Paper," Agilent Technologies, pp. 1-14 (Apr. 1, 2003).
Notice of Allowance and Fee(s) Due for U.S. Appl. No. 09/759,743 (Mar. 10, 2003).
Interview Summary for U.S. Appl. No. 09/759,743 (Feb. 27, 2003).
Foster et al., "Number Portability in the Global Switched Telephone Network (GSTN): An Overview," Network Working Group, RFC 3482 (Feb. 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP Map Gateway for Public WLAN Slm Authentication and Authorization," Cisco Systems, Inc., pp. 1-13 (Copyright 1992-2003).
Final Official Action for U.S. Appl. No. 09/759,743 (Dec. 2, 2002).
Barry, "A Signal for Savings," Packet, Cisco Systems Users Magazine, vol. 14, No. 4, pp. Cover; 19-21; and 81 (Fourth Quarter 2002).
Interview Summary for U.S. Appl. No. 09/759,743 (Sep. 13, 2002).
Official Action for U.S. Appl. No. 09/759,743 (May 23, 2002).
Interview Summary for U.S. Appl. No. 09/759,743 (Mar. 6, 2002).
"Global Implementation of ENUM: A Tutorial Paper," International Telecommunication Union, Telecommunication Standardization Union, Study Group 2, (Feb. 8, 2002).
"Agilent Technologies and Cisco Systems SS7 Over IP White Paper," Cisco Systems, Inc. and Agilent and Technologies, pp. 1-6 (Copyright 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
Official Action for U.S. Appl. No. 09/759,743 (Dec. 3, 2001).
International Preliminary Examination Report for International Application No. PCT/US01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Mealling, "The Naming Authority Pointer (NAPTR) DNS Resource Record," Network Working Group, RFC 2915 (Sep. 2000).
Rockhold, "Or," Wireless Review, p. 22, 23, 26, 28, 30, 32, (Aug. 15, 2000).
"Topsail Beach-SS7 Over IP-" Cisco Systems, Inc., pp. 1-16 (Copyright 1999).
Smith, "Number Portability Pileup," Telephony, p. 22, 24, 26, (Jan. 6,1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling; Specifications of Signalling Systems No. 7—Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).

(56) References Cited

OTHER PUBLICATIONS

ETSI, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN and intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network Interface Specification (CCSNIS) Supporting SCCP and TCAP," Bell Communications Research, p. ii-xii, 1-1—C-22, (Mar. 1994).
Buckles, "Very High Capacity Signaling Trnsfer Point for Intelligent Network Servcies," DSC Communciations Corporation, p. 1308-1311, (1988).
Communication under Rule 71(3) EPC for European Application No. 07 810 606.9 (Mar. 4, 2014).
First Examination Report for Indian Application No. 663/CHEN/2009 (Feb. 6, 2014).
Final Office Action for Chinese Application No. 200880103119.4 (Dec. 4, 2013).
Extended European Search Report for European Application No. 08770806.1 (Dec. 2, 2013).
Extended European Search Report for European Application No. 07809476.0 (Nov. 6, 2013).
"Digital cellular telecommunications system (Phase 2+); Universal Mobile Telecommunications System (UMTS); LTE; Circuit Switched (CS) fallback in Evolved Packet System (EPS); Stage 2," ETSI TS 123 272, V11.3.0, pp. 1-93 (Jan. 2013).
"3rd Generation Partnership Project; Technical Specification Group Services and System Aspects; IP Multimedia Subsystem (IMS); Stage 2 (Release 8)," 3GPP TS 23.228, V8.1.0 (Jun. 2007).
"Infrastructure ENUM" 05TD143r4 Draft ETSI TR 102 055, V0.0.8 (2005).
Notification of Transmittal of the International Search Report and the Written Opinion of the International Searching Authority, or the Declaration for PCT International Application No. PCT/US2014/017800 (Dec. 12, 2014).
Communication pursuant to Article 94(3) EPC for European Patent Application No. 08770806.1 (Oct. 10, 2014).
Notification of Reexamination for Chinese Patent Applcation No. 200780034804.1 (Sep. 15, 2014).
First Examiniation Report for Indian Patent Application No. 3929/CHENP/2009 (Aug. 20, 2014).
Communication pursuant to Article 94(3) EPC for European Patent Application No. 08770806.1 (Aug. 6, 2014).
Decision to Grant a European Patent Pursuant to Article 97(1) EPC for European Patent Application No. 07809476.0 (Jul. 31, 2014).
First Examination Report for Indian Patent Application No. 7234/CHENP/2008 (Jul. 18, 2014).
Communication under Rule 71(3) EPC for European Patent Application No. 07809476.0 (Jun. 23, 2014).
Notification of Reexamination for Chinese Patent Application No. 200780034804.1 (May 14, 2014).
Decision to grant a European patent pursuant to Article 97(1) EPC for European Patent Application No. 07810606.9 (Apr. 25, 2014).
Letter Regarding Granted Patent Information for Indian Patent Application No. 7234/CHENP/2008 (Sep. 14, 2015).
Letter Regarding Decision to Grant for Chinese Patent Application No. 200780034804.1 (Jul. 30, 2015).
First Examination Report for Indian Patent Application No. 185/CHENP/2010 (Jul. 28, 2015).
Second Examination Report for Indian Patent Application No. 7234/CHENP/2008 (May 14, 2015).
Decision to Grant a European Patent pursuant to Article 97(1) EPC for European Patent Application No. 08770806.1 (May 4, 2015).
Reexamination Decision for Chinese Patent Application No. 200780034804.1 (Mar. 27, 2015).
Letter Regarding Telephone Interview for Chinese Patent Application No. 200780034804.1 (Mar. 6, 2015).
Communication Under Rule 71(3) EPC for European Patent Application No. 08770806.1 (Mar. 3, 2015).
Communication of European publication number and information on the application of Article 67(3) EPC for European Application No. 14709831.3 (Dec. 23, 2015).
Notification of Reexamination for Chinese Application No. 200880103119.4 (Nov. 11, 2015).
Extended European Search Report for European Application No. 09717865.1 (Jul. 17, 2015).
"Address Resolution in MMS (Re: SerG LS E.164 Address Scheme)", Liaison Statement, 3GPP TSG-T WG2-SWG3, http://www.3gpp.org/ftp/tsg_t/WG2_Capability/TSGT2_15_Cancun/Docs/, (Dec. 4, 2001).
Communication of the extended European search report for European Patent Application No. 14709831.3 (Aug. 5, 2016).
Partial Supplementary European Search Report for European Patent Application No. 14709831.3 (Jul. 8, 2016).
Hearing Notice for Indian Patent Application No. 663/CHENP/2009 (May 17, 2016).
Second Notification of Reexamination for Chinese Patent Application No. 200880103119.4 (Apr. 21, 2016).
"Digital cellular telecommunications system (Phase 2+); Universal Mobile Telecommunications System (UMTS); LTE; Circuit Switched (CS) fallback in Evolved Packet System (EPS); Stage 2," 3GPP TS 23.272 version 11.4.0 Release 11, pp. 1-93 (Apr. 2013).
Tekelec, "Tekelec Eagle® 5," Feature Manual—MO SMS, 910-6260-001 Revision A, pp. 1-148 (Jan. 2012).

\* cited by examiner

METHODS, SYSTEMS, AND COMPUTER READABLE MEDIA FOR UTILIZING A DIAMETER PROXY AGENT TO COMMUNICATE SHORT MESSAGE SERVICE (SMS) MESSAGES

TECHNICAL FIELD

The subject matter described herein relates to the communication and routing of short message service (SMS) messages and Diameter agents used in an evolved packet system (EPS). More particularly, the subject matter described herein relates to systems, methods, and computer readable media for utilizing a Diameter proxy agent to communicate SMS messages.

BACKGROUND

In telecommunications networks that support mobile subscribers, there is a need to know or determine the current location of mobile subscribers so that communications, such a short message service (SMS) messages, may be directed to those mobile subscribers. In mobile telephone networks, there are network entities that are responsible for storing and managing the mobile subscriber location information. In third-generation (3G) and long term evolution (LTE) telecommunications networks, the home subscriber server (HSS) is responsible for managing this type of information. The HSS may also be configured to receive queries for the current location information of a particular mobile subscriber and reply to the queries with the last known location of the mobile subscriber. The location may be provided in the form of the network address or identifier of network entity, such as a mobile switching center (MSC) or mobility management entity (MME), that is currently serving the mobile subscriber.

On occasion, an SMS message may be communicated to a mobile subscriber via an LTE access network and an evolved packet system (EPS). In such instances, standards such as 3GPP TS 23.272 and 3GPP TS 29.338 define Diameter based protocols that may be used by SMS-capable MMEs that handle the communication of an SMS. However, these existing standards currently do not define the manner in which an LTE network may route an SMS message if a recipient mobile subscriber has ported out of network. Specifically, there is no definable means described in the standards to properly forward a mobile subscriber location information request message to the correct HSS if the recipient mobile subscriber has been ported to a foreign network.

Accordingly, in light of these potential disadvantages, there exists a need for methods, systems, and computer readable media for utilizing a Diameter proxy agent to communicate SMS messages.

SUMMARY

Methods, systems, and computer readable media for utilizing a Diameter proxy agent to communicate SMS messages in a Diameter network are disclosed. According to one aspect, a method includes receiving, from an SMS service center via a Diameter interface, a mobile subscriber location information request message directed to a home subscriber server (HSS) in the first network, wherein the mobile subscriber location information request message is associated with a recipient mobile subscriber. The method further includes querying a number portability (NP) database to determine whether the recipient mobile subscriber has been ported to a foreign network and forwarding the mobile subscriber location information request message toward a gateway associated with the foreign network. In response to determining the recipient mobile subscriber has been ported to the foreign network. The method also includes, in response to determining the recipient mobile subscriber has not been ported to the foreign network, forwarding the request message to the HSS in the first network.

According to yet another aspect, the subject matter described herein comprises a method including, at a Diameter proxy agent located in a home network, receiving, from a mobility management entity (MME) via a Diameter interface, a mobile originated-forward short message (MO-FSM) message directed to a short message service (SMS) service center located in the home network, wherein the MO-FSM message is originated from a sending mobile subscriber. The method further includes querying a local database to determine if the SMS service center is located in the home network and querying a number portability (NP) database to determine whether the sending mobile subscriber is not a subscriber to the home network if the SMS service center is located in the home network. In response to determining the sending mobile subscriber is not a subscriber to the home network, the method includes sending an error message to the sending mobile subscriber. In response to determining the sending mobile subscriber is a subscriber to the home network, the method includes forwarding the MO-FSM message to the SMS service center associated with the home network.

The subject matter described herein may be implemented in hardware, software, firmware, or any combination thereof. As such, the terms "function", "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
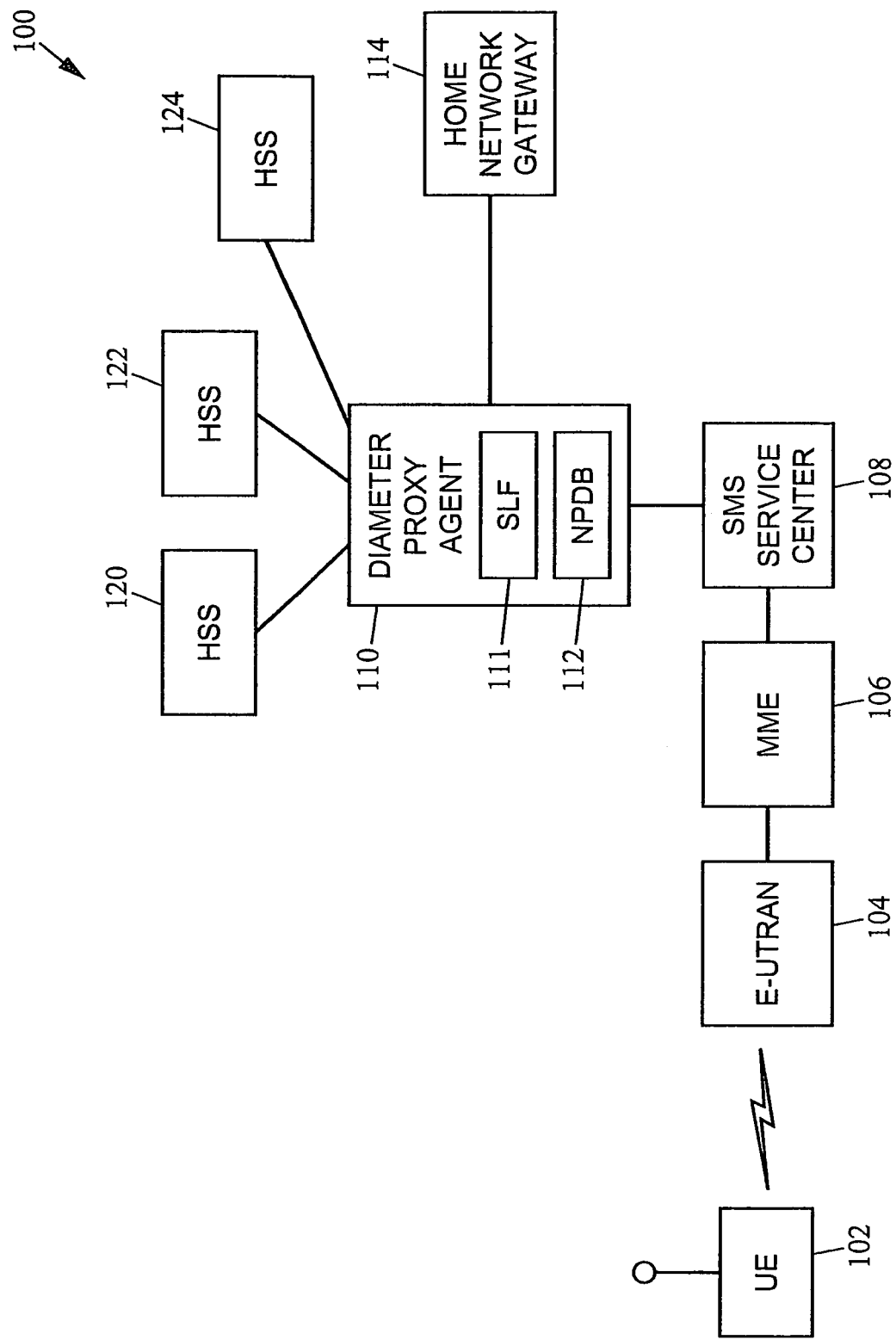
FIG. 1 is a block diagram illustrating an exemplary system for utilizing a Diameter proxy agent to determine the destination for a short message service (SMS) message according to an embodiment of the subject matter described herein.

The subject matter described herein relates to methods, systems, and computer readable medium for utilizing a Diameter proxy agent to communicate SMS messages in an evolved packet system (EPS) or evolved packet core (EPC). FIG. 1 is a block diagram illustrating an exemplary system for utilizing a Diameter proxy agent to determine the destination for a short message service (SMS) message according to an embodiment of the subject matter described herein. Referring to FIG. 1, a home network 100 includes a user equipment (UE) 102, an evolved-UMTS terrestrial radio access network (E-UTRAN) 104, a mobility management entity (MME) 106, and an SMS service center 108. Home network 100 further includes a Diameter Proxy Agent 110, a plurality of HSSs 120-124, and a home network gateway 114. In some embodiments, each of HSS 120-124 may be configured to contain subscription-related information, such as user profiles (e.g., LTE registration), perform authentication and authorization of subscribers, and provide information about the physical location (e.g., in a foreign network) of the mobile subscriber device.

Referring to FIG. 1, UE 102 may include a mobile device, smartphone, tablet computer, or any, other device capable of generating an SMS or multimedia message service (MMS) message. In one embodiment, a mobile subscriber (e.g., sending party) utilizes UE 102 to generate a short message (SM) submission (e.g., a text message) that is subsequently sent to E-UTRAN 104. In some embodiments, E-UTRAN 104 may include an evolved nodeB (enodeB) that is configured to wirelessly receive the SM submission from UE 102 via an LTE communication. E-UTRAN 104 may generate a mobile originated-forward short message (MO-FSM) message that includes the SM submission. The MO-FSM message may be delivered to SMS service center 108 via MME 106. In some embodiments, SMS service center 108 may include at least one of an SMS-gateway switching center (SMS-GMSC), an interworking mobile switching center (IWMSC), a short message switching center (SMSC), and an SMS router.

In one embodiment, SMS service center 108 may receive the MO-FSM message which includes a destination address or mobile subscriber identifier associated with a recipient mobile subscriber (or with a network element that is servicing the recipient mobile subscriber). In response to receiving the MO-FSM message, SMS service center 108 may be configured to generate a mobile subscriber location information request message, such as a Send Routing Information for short message (SRI-SM) message that includes the mobile subscriber identifier or address associated with the destination, i.e., the receiving mobile subscriber. Exemplary mobile subscriber location information request messages may include a Send Routing Information (SRI) message, a SRI for short message (SRI-SM) message, a SRI for general packet radio service (SRI-GPRS) message, a SRI for location services (SRI-LCS) message, and a Diameter location information request (LIR) message.

In some embodiments, the mobile subscriber identifier may include an MSISDN, an Internet protocol (IP) address, a destination-host identifier and/or a destination-realm identifier associated with the mobile subscriber, a network entity (e.g., HSS) that is currently serving the subscriber associated with a mobile subscriber. SMS service center 108 may be further configured to send the SRI-SM message toward an HSS (e.g., one of HSS 120-124) in home network 100 that includes location information associated with the receiving mobile subscriber. For example, the location information may include information that identifies a switch, host, or other network entity (e.g., an S-CSCF) that is currently servicing the receiving mobile subscriber.

In some embodiments, a Diameter proxy agent 110 may receive and/or intercept the SRI-SM message sent by SMS service center 108. The SRI-SM message may be sent and received via a Diameter S6c interface. Diameter proxy agent 110 may include any router, server, or computing device configured to receive, process, and send Diameter based messages. Upon receiving the SRI-SM message, Diameter proxy agent 110 may be configured to extract the receiving mobile subscriber identifier (or address) and query a number portability (NP) database 112 that is configured to store number portability information associated with mobile subscribers. For example, NP database 112 may include entries of identifiers/addresses associated with mobile device subscribers that have ported out of home network 100 as well as ported into home network 100. The entries of NP database 112 may also include an identifier/address associated with the foreign network or a network element in the foreign network the mobile subscriber has ported to (e.g., a location routing number (LRN)). Although number portability database 112 is depicted as a database stored locally on Diameter proxy agent 110, an external NP database accessible by Diameter proxy agent 110 may be utilized without departing from the scope of the present subject matter. In one embodiment, Diameter proxy agent 110 may cross-reference and compare the mobile subscriber identifier associated with the receiving mobile subscriber with entries of NP database 112. If a matching entry is found, then Diameter proxy agent 110 may determine that the receiving mobile subscriber has ported out of home network 100 and ported to a foreign network identified in NP database 112. In one embodiment, Diameter proxy agent 110 may utilize NP database 112 determine that the recipient mobile subscriber is owned by the foreign network. Similarly, Diameter proxy agent 110 may also determine whether the receiving mobile subscriber has ported into home network 100. Notably, the number portability check conducted by Diameter proxy agent 110 may serve as a function to avoid the communication problems associated with forwarding a SRI-SM message intended for a mobile subscriber that has ported out of home network 100. Thus, in instances where Diameter proxy agent 110 determines that the receiving mobile subscriber is ported from home network 100, Diameter proxy agent 110 may forward the SRI-SM message to the foreign network hosting the recipient mobile subscriber via home network gateway 114 (or a switch). Alternatively, if Diameter proxy agent 110 determines that the receiving mobile subscriber is not included in NP database 112, Diameter proxy agent 110 may forward the SRI-SM message to the HSS the message was originally sent and the SMS delivery process continues as normal.

In an alternate embodiment, if Diameter proxy agent 110 determines that the receiving mobile subscriber is not included in NP database 112, Diameter proxy agent 110 may utilize subscriber locator function 111 to determine the HSS containing the location information associated with the receiving mobile subscriber. Subscriber locator function 111 may include a database that maps mobile subscriber identifiers with the respective HSS host identifiers. Accordingly, Diameter proxy agent 110 is able to ascertain the correct HSS that contains the location information of the receiving mobile subscriber in instances where the receiving mobile subscriber is an original subscriber or a ported in subscriber to home network 100. To obtain the location information of the receiving mobile subscriber, Diameter proxy agent may send a Diameter location information request to the identified HSS. The HSS will subsequently respond to Diameter proxy agent 110 with a Diameter location information answer (LIA) message. From the Diameter location information answer, Diameter proxy agent 110 may instructed to forward the SRI-SM message to a switch in the recipient network. Specifically, the location information provided by the HSS may include the address or other identifier, such as a location routing number (LRN), a point code address, a uniform resource identifier (URI), and/or an Internet protocol address of a node in the network that is currently serving the recipient mobile subscriber. The mobile subscriber location request (e.g., SRI-SM message) may then include the provided location information for the purpose of delivery of an SMS message to the recipient mobile subscriber.

Figure 2:
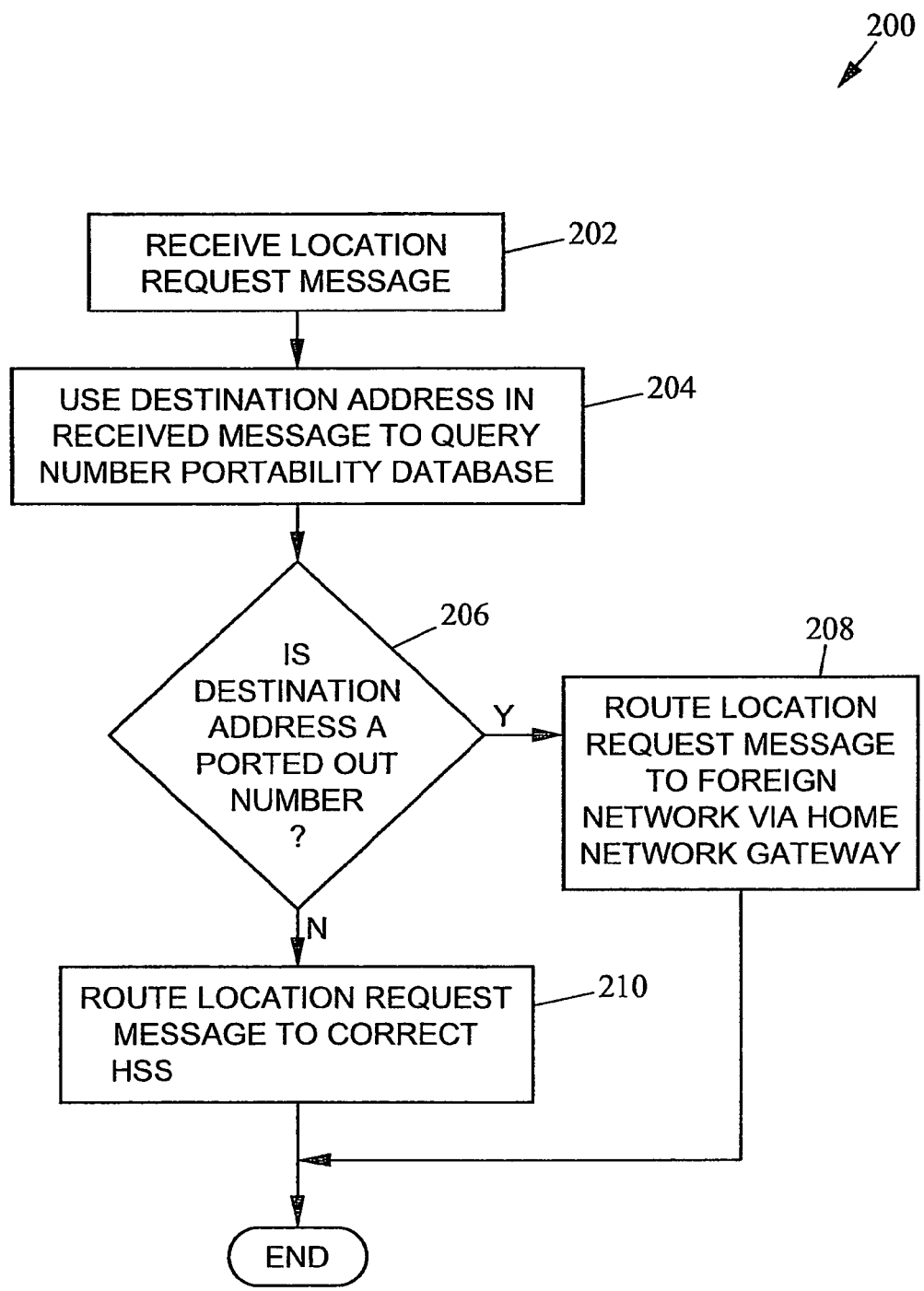
FIG. 2 is a flow chart illustrating an exemplary process for utilizing a Diameter proxy agent to determine the destination for a short message service (SMS) message according to an embodiment of the subject matter described herein.

FIG. 2 is a flow chart illustrating an exemplary method 200 for utilizing a Diameter proxy agent to determine the destination for an SMS message according to an embodiment of the subject matter described herein. In step 202, a mobile subscriber location information request message is received. In one embodiment, a Diameter proxy agent receives (or intercepts) a mobile subscriber location information request message, such as a SRI-SM message, from an SMS service center. The mobile subscriber location information request message may initially be directed to a specific HSS in the home network (i.e., a first network).

In step 204, the destination address in the received mobile subscriber location information request message is used to query a number portability database. In one embodiment, the Diameter proxy agent may extract a mobile subscriber identifier from the received SRI-SM message and use the extracted identifier to query a local number portability database.

In step 206, a determination is made as to whether the destination address has been ported out of the home network to a foreign network. In one embodiment, the Diameter proxy agent may compare the mobile subscriber identifier from the received mobile subscriber location information request message with entries in a number portability database. In some embodiments, the Diameter proxy agent may also be configured to use the number portability database and/or another database to determine if the recipient mobile subscriber is owned by the foreign network. If a matching entry is found in the number portability database, then the Diameter proxy agent determines that the recipient mobile subscriber has been ported to a foreign network (i.e., a network that is separate and distinct from the home network) or is owned by the foreign network and method 200 continues to step 208. If a matching entry is not found in the number portability database, then the recipient mobile subscriber has not been ported from the home network and method 200 proceeds to step 210. In some embodiments, method 200 may proceed to step 210 in the event the Diameter proxy agent determines that the recipient mobile subscriber has ported into the home network.

In step 208, the mobile subscriber location information request message is routed to the foreign network via a home network gateway or switch. In one embodiment, the Diameter proxy agent routes mobile subscriber location information request message to the ported to address contained in the number portability database. For example, Diameter proxy agent may forward the mobile subscriber location information request message to a gateway or switch in the home network, which in turn may direct the mobile subscriber location information request message to the foreign network that hosts the ported to recipient mobile subscriber.

In step 210, the SRI-SM message is routed to the correct HSS. If it is determined that the recipient mobile subscriber has not been ported out of the home network (in step 206), then the Diameter proxy agent may ascertain the specific HSS that contains location information associated with the recipient mobile subscriber. In one embodiment, the Diameter proxy agent may forward the SRI-SM message to the HSS the message was originally addressed. In another embodiment, the Diameter proxy agent may query a database to determine which HSS (from among a plurality of HSSs) in the home network (i.e., the first) contains the location information associated with the recipient mobile subscriber. Alternatively, the HSS may be located in another network that is not the home network or the foreign network. The Diameter proxy agent may then utilize the obtained location information to proceed with the delivery of the SMS message.

Figure 3:
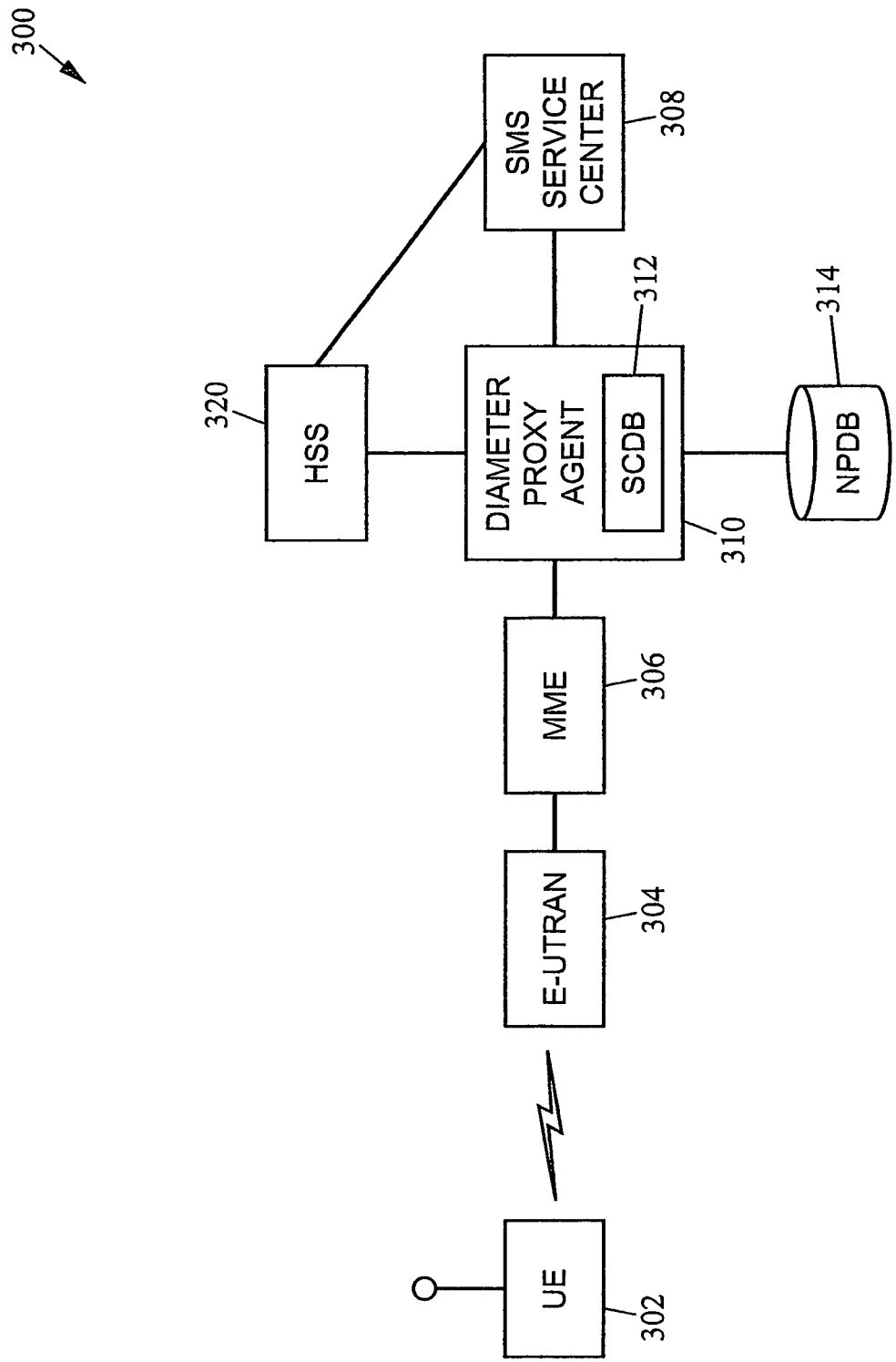
FIG. 3 is a block diagram illustrating an exemplary system for utilizing a Diameter proxy agent to selectively forward a short message service (SMS) message to an SMS service center according to an embodiment of the subject matter described herein.

FIG. 3 is a block diagram illustrating an exemplary system for utilizing a Diameter proxy agent to selectively forward an SMS message to an SMS service center according to an embodiment of the subject matter described herein. Similar to network 100 depicted in FIG. 1, FIG. 3 includes a home network 300 that includes a UE 302, an E-UTRAN 304, a MME 306, an SMS service center 308, and an HSS 320, each of which is capable of performing the same functions described above with respect to FIG. 1. Home network 300 further includes a Diameter Proxy Agent 310 that is positioned between MME 306 and SMS service center 308 and a number portability database 314 that is accessible by Diameter Proxy Agent 310.

Referring to FIG. 3, a sending mobile subscriber utilizes UE 302 to generate a short message (SM) submission (e.g., a text message) that is sent to E-UTRAN 304. In some embodiments, E-UTRAN 304 may include an evolved nodeB (enodeB) that is configured to wirelessly receive the SM submission from UE 302 via an LTE communication. After receiving the SM submission, E-UTRAN 304 may generate a mobile originated-forward short message (MO-FSM) message that contains the SM submission. Notably, the MO-FSM message may be addressed to SMS service center 308 as the destination.

In one embodiment, E-UTRAM 304 sends the MO-FSM message to MME 306 for delivery to SMS service center 308. MME 306 forwards the MO-FSM message, which is subsequently received and/or intercepted by Diameter proxy agent 310. The MO-FSM message may be sent and received via a Diameter SGd interface. In some embodiments, Diameter proxy agent 310 includes a local service center database 312 which contains a list of entries that includes valid SMS service center addresses or identifiers associated with home network 300 (e.g., located in or hosted by home network 300). Diameter proxy agent 310 may also be configured to use the SMS service center address contained in the received MO-FSM message for querying the entries of database 312. If a matching entry is found, then Diameter proxy agent 310 may validate the SMS service center address. Otherwise, Diameter proxy agent 310 may send an error message to UE 302 if no matching entry is found in database 312.

After validating of the SMS service center address in the MO-FSM message, Diameter proxy agent 310 may be configured to use the sending mobile subscriber identifier in the MO-FSM message to query entries of a number portability (NP) database 314. If the sending mobile subscriber identifier matches an entry in NP database 314, then Diameter proxy agent 310 may determine that the sending mobile subscriber has been ported out of home network 300 and is improperly (e.g., inadvertently, fraudulently, etc.) using home network 300 for sending SMS messages. In such a scenario, Diameter proxy agent 310 may discard the MO-FSM message and send an error message to UE 302.

Alternatively, if the sending mobile subscriber identifier does not match an entry in NP database 314, then Diameter proxy agent 310 may determine that the sending mobile subscriber has not been ported out of home network 100. In such a scenario, Diameter proxy agent 310 may send the MO-FSM message to SMS service center 308 for further SMS delivery processing.

In an alternative embodiment, the number portability information contained in database 314 and the service center address information contained in 314 may be present in a common database that is accessible by Diameter proxy agent 110. Thus, the number portability information and the service center address information in a single lookup.

Figure 4:
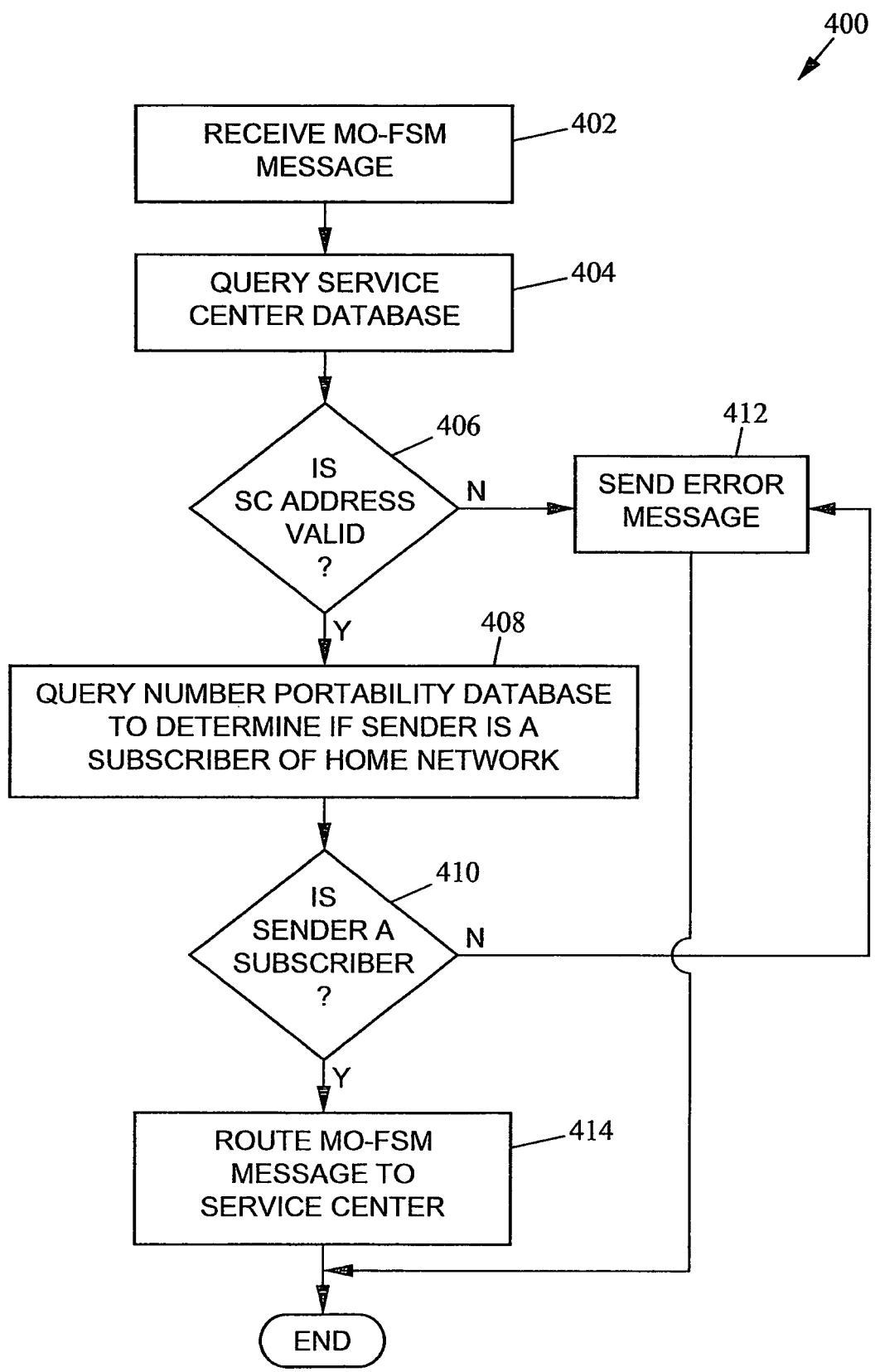
FIG. 4 is a flow chart illustrating an exemplary process for utilizing a Diameter proxy agent to selectively forward a short message service (SMS) message to an SMS service center according to an embodiment of the subject matter described herein.

FIG. 4 is a flow chart illustrating an exemplary method 400 for utilizing a Diameter proxy agent to selectively forward an SMS message to an SMS service center according to an embodiment of the subject matter described herein. In step 402, a MO-FSM message is received. In one embodiment, a Diameter proxy agent may be positioned in between an MME and an SMS service center in a home network. The Diameter proxy agent may receive an MO-FSM message that is being forwarded to the SMS service center from the MME.

In step 404, the validity of the SMS service center address in the received message is checked. In one embodiment, the Diameter proxy agent uses the SMS service center address or identifier to query a database containing valid SMS service center addresses in the home network.

In step 406, a determination is made as to whether the SMS service center address is valid. In one embodiment, the Diameter proxy agent may determine that the SMS service center address is valid by finding a matching entry in the queried service center database. In such a scenario, method 400 continues to step 408. If the Diameter proxy agent determines that the SMS service center is invalid (e.g., not finding a matching entry in the service center database), then method 400 proceeds to block 412 where an error message is sent (e.g., to the sending mobile subscriber).

In step 408, the sending mobile subscriber identifier in the message is used to query a number portability database to determine if the sender is a subscriber to the home network. In one embodiment, the Diameter proxy agent may extract a origin-host identifier and/or origin-realm identifier from the received MO-FSM message and use the extracted identifier(s) to query a number portability database.

In step 410, a determination is made as to whether the sending mobile subscriber identifier (e.g., originating address) has been ported out of the home network. In one embodiment, the Diameter proxy agent may compare the mobile subscriber identifier (e.g., origin-host identifier and/or the origin-realm identifier) from the received MO-FSM message with entries in a number portability database. If a matching entry is found, then the sending mobile subscriber has been ported to a foreign network (i.e., a network that is separate and distinct from the home network) and method 400 continues to step 412 where an error message is sent (e.g., to the sending mobile subscriber). If a matching entry is not found, then the sending mobile subscriber has not been ported from the home network and method 200 proceeds to step 414.

In step 414, the MO-FSM message is routed to the SMS service center. In one embodiment, after determining that the sending mobile subscriber has not been ported to a foreign network, the Diameter proxy node may then route the message to the SMS service center the message was originally addressed. In another embodiment, the Diameter proxy agent may use a selection function to query a database to determine which SMS service center (from among a plurality of SMS service centers in the home network) should continue the delivery process of the received MO-FSM message.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for utilizing a Diameter proxy agent to communicate short message service (SMS) messages in a Diameter network, the method comprising:
   at a Diameter proxy agent located in a first network:
   receiving, from an SMS service center via a Diameter interface, a mobile subscriber location information request message directed to a home subscriber server (HSS), wherein the mobile subscriber location information request message includes a mobile subscriber identifier associated with a recipient mobile subscriber, wherein the Diameter interface includes an S6c Diameter interface;
   querying a number portability database to match the mobile subscriber identifier associated with the recipient mobile subscriber to an entry in the number portability database in order to determine whether the recipient mobile subscriber has been ported to a foreign network or ported into the first network, wherein the number portability database includes a location routing number (LRN) of a network element that is serving the recipient mobile subscriber in the foreign network if the recipient mobile subscriber has been ported to the foreign network;
   in response to determining the recipient mobile subscriber has been ported to the foreign network or is owned by the foreign network, forwarding the mobile subscriber location information request message to the foreign network using the LRN obtained from the number portability database; and
   in response to determining the recipient mobile subscriber has not been ported to the foreign network or has been ported into the first network, utilizing a subscriber location function in the Diameter proxy agent to determine an HSS in the first network that contains location information associated with the recipient mobile subscriber, and forwarding the request message to the HSS determined by the subscriber location function.

2. The method of claim 1 wherein the mobile subscriber location request message includes one of: a Send Routing Information (SRI) message, a SRI for short message (SRI-SM) message, a SRI for general packet radio service (SRI- GPRS) message, a SRI for location services (SRI-LCS) message, and a Diameter location information request (LIR) message.

3. The method of claim 1 wherein the mobile subscriber identifier includes at least one of: an MSISDN, an Internet protocol (IP) address, a destination-host identifier, and a destination-realm identifier associated with the recipient mobile subscriber.

4. The method of claim 1 wherein the SMS service center includes at least one of: an SMS-gateway switching center (SMS-GMSC), an interworking mobile switching center (IWMSC), a short message switching center (SMSC), and an SMS router.

5. The method of claim 1 wherein the number portability database is located on the Diameter proxy agent.

6. The method of claim 1 wherein mobile subscriber location information request message includes a Diameter location information request (LIR) message.

7. A method for utilizing a Diameter proxy agent to communicate SMS messages in a Diameter network, the method comprising:
at a Diameter proxy agent located in a home network:
receiving, from a mobility management entity (MME) via a Diameter interface, a mobile originated-forward short message (MO-FSM) message directed to a short message service (SMS) service center located in the home network, wherein the MO-FSM message is originated from a sending mobile subscriber and includes a mobile subscriber identifier associated with the sending mobile subscriber;
utilizing an address of the SMS service center contained in the received MO-FSM message to query a local service center database in the Diameter proxy agent that contains a list of entries that includes valid SMS service center addresses associated with the home network to validate whether the SMS service center is located in or hosted by the home network;
if the SMS service center is validated, querying a number portability database to match the mobile subscriber identifier associated with the sending mobile subscriber to an entry in the number portability database in order to determine whether the sending mobile subscriber has been ported to a foreign network or is otherwise not a subscriber to the home network, wherein the number portability database includes a location routing number (LRN) of a network element that is serving the sending mobile subscriber in the foreign network if the sending mobile subscriber has been ported to the foreign network;
in response to determining the sending mobile subscriber is not a subscriber to the home network, sending an error message to the sending mobile subscriber; and
in response to determining the sending mobile subscriber is a subscriber to the home network, forwarding the MO-FSM message to the SMS service center associated with the home network.

8. The method of claim 7 wherein the mobile subscriber identifier includes at least one of: an MSISDN, an Internet protocol (IP) address, a destination-host identifier, and a destination-realm identifier associated with the sending mobile subscriber.

9. The method of claim 7 wherein the SMS service center includes at least one of: an SMS-gateway switching center (SMS-GMSC), an interworking mobile switching center (IWMSC), a short message switching center (SMSC), and an SMS router.

10. The method of claim 7 wherein the Diameter interface includes a SGd Diameter interface.

11. The method of claim 7 wherein the number portability database is located on the Diameter proxy agent.

12. The method of claim 7 wherein the home network is a Diameter based network.

13. The method of claim 7 wherein the MO-FSM message includes a Diameter protocol message.

14. A system for utilizing a Diameter proxy agent to communicate short message service (SMS) messages in a Diameter network, the system comprising:
an SMS service center located in a first network configured to send a mobile subscriber location information request message, wherein the mobile subscriber location information request message is initially directed to a home subscriber server (HSS) and includes a mobile subscriber identifier associated with a recipient mobile subscriber; and
a Diameter proxy agent located in the first network configured to receive the mobile subscriber location information request message via a Diameter interface, query a number portability database to match the mobile subscriber identifier associated with the recipient mobile subscriber to an entry in the number portability database in order to determine whether the recipient mobile subscriber has been ported to a foreign network or ported into the first network, wherein the number portability database includes a location routing number (LRN) of a network element that is serving the recipient mobile subscriber in the foreign network if the recipient mobile subscriber has been ported to the foreign network, forward the mobile subscriber location information request message toward the foreign network using the LRN obtained from the number portability database in response to determining the recipient mobile subscriber has been ported to the foreign network or is owned by the foreign network, and utilizing a subscriber location function in the Diameter proxy agent to determine an HSS in the first network that contains location information associated with the recipient mobile subscriber, and forwarding the request message to the HSS determined by the subscriber location function in response to determining the recipient mobile subscriber has not been ported to the foreign network or has been ported into the first network, wherein the Diameter interface includes an S6c Diameter interface.

15. The system of claim 14 wherein the mobile subscriber location request message includes one of: a Send Routing Information (SRI) message, a SRI for short message (SRI-SM) message, a SRI for general packet radio service (SRI-GPRS) message, a SRI for location services (SRI-LCS) message, and a Diameter location information request (LIR) message.

16. The system of claim 14 wherein the mobile subscriber identifier includes at least one of: an MSISDN, an Internet protocol (IP) address, a destination-host identifier, and a destination-realm identifier associated with the recipient mobile subscriber.

17. The system of claim 14 wherein the SMS service center includes at least one of: an SMS-gateway switching center (SMS-GMSC), an interworking mobile switching center (IWMSC), a short message switching center (SMSC), and an SMS router.

18. The system of claim 14 wherein the number portability database is located on the Diameter proxy agent.

19. The system of claim 14 wherein mobile subscriber location information request message includes a Diameter location information request (LIR) message.

20. A system for utilizing a Diameter proxy agent to communicate short message service (SMS) messages in a Diameter network, the system comprising:
 a mobility management entity (MME) located in a home network configured to send a mobile originated-forward short message (MO-FSM) message, wherein the MO-FSM message originated from a sending mobile subscriber and includes a mobile subscriber identifier associated with the sending mobile subscriber, and wherein the MO-FSM message is initially directed to a short message service (SMS) service center located in the home network; and
 a Diameter proxy agent located in the home network configured to receive the MO-FSM message, utilizing an address of the SMS service center contained in the received MO-FSM message to query a local service center database in the Diameter proxy agent that contains a list of entries that includes valid SMS service center addresses associated with the home network to validate whether the SMS service center is located in or hosted by the home network, query a number portability database to match the mobile subscriber identifier associated with the sending mobile subscriber to an entry in the number portability database in order to determine whether the sending mobile subscriber is not a subscriber to the home network if the SMS service center is validated, wherein the number portability database includes a location routing number (LRN) of a network element that is serving the sending mobile subscriber in the foreign network if the sending mobile subscriber has been ported to the foreign network, send an error message to the sending mobile subscriber in response to determining the sending mobile subscriber is not a subscriber to the home network, and forward the MO-FSM message to the SMS service center associated with the home network in response to determining the sending mobile subscriber is a subscriber to the home network.

21. The system of claim 20 wherein the mobile subscriber identifier includes at least one of: an MSISDN, an Internet protocol (IP) address, a destination-host identifier, and a destination-realm identifier associated with the sending mobile subscriber.

22. The system of claim 20 wherein the SMS service center includes at least one of: an SMS-gateway switching center (SMS-GMSC), an interworking mobile switching center (IWMSC), a short message switching center (SMSC), and an SMS router.

23. The system of claim 20 wherein the Diameter interface includes a SGd Diameter interface.

24. The system of claim 20 wherein the number portability database is located on the Diameter proxy agent.

25. The system of claim 20 wherein the home network is a Diameter based network.

26. The system of claim 20 wherein the MO-FSM message includes a Diameter protocol message.

27. A non-transitory computer readable medium having stored thereon executable instructions that when executed by the processor of a computer control the computer to perform steps comprising:
 at a Diameter proxy agent located in a first network:
  receiving, from an SMS service center via a Diameter interface, a mobile subscriber location information request message directed to a home subscriber server (HSS), wherein the mobile subscriber location information request message includes a mobile subscriber identifier associated with a recipient mobile subscriber, wherein the Diameter interface includes an S6c Diameter interface;
  querying a number portability database to match the mobile subscriber identifier associated with the recipient mobile subscriber to an entry in the number portability database in order to determine whether the recipient mobile subscriber has been ported to a foreign network or ported into the first network, wherein the number portability database includes a location routing number (LRN) of a network element that is serving the recipient mobile subscriber in the foreign network if the recipient mobile subscriber has been ported to the foreign network;
  in response to determining the recipient mobile subscriber has been ported to the foreign network or is owned by the foreign network, forwarding the mobile subscriber location information request message to the foreign network using the LRN obtained from the number portability database; and
  in response to determining the recipient mobile subscriber has not been ported to the foreign network or has been ported into the first network, utilizing a subscriber location function in the Diameter proxy agent to determine an HSS in the first network that contains location information associated with the recipient mobile subscriber, and forwarding the request message to the HSS determined by the subscriber location function.

28. A non-transitory computer readable medium having stored thereon executable instructions that when executed by the processor of a computer control the computer to perform steps comprising:
 at a Diameter proxy agent located in a home network:
  receiving, from a mobility management entity (MME) via a Diameter interface, a mobile originated-forward short message (MO-FSM) message directed to a short message service (SMS) service center located in the home network, wherein the MO-FSM message is originated from a sending mobile subscriber and includes a mobile subscriber identifier associated with the sending mobile subscriber;
  utilizing an address of the SMS service center contained in the received MO-FSM message to query a local service center database in the Diameter proxy agent that contains a list of entries that includes valid SMS service center addresses associated with the home network to validate whether the SMS service center is located in or hosted by the home network;
  if the SMS service center is validated, querying a number portability database to match the mobile subscriber identifier associated with the sending mobile subscriber to an entry in the number portability database in order to determine whether the sending mobile subscriber has been ported to a foreign network or is otherwise not a home network subscriber, wherein the number portability database includes a location routing number (LRN) of a network element that is serving the sending mobile subscriber in the foreign network if the sending mobile subscriber has been ported to the foreign network;

in response to determining the sending mobile subscriber is not a subscriber to the home network, sending an error message to the sending mobile subscriber; and in response to determining the sending mobile subscriber is a subscriber to the home network, forwarding the MO-FSM message to the SMS service center associated with the home network.

* * * * *